Feb. 11, 1958 F. RUDINGER 2,822,765
BOMBSHELTER
Filed Feb. 13, 1956

INVENTOR.
FRED RUDINGER
BY
Arthur H. Seidel
ATTORNEY

United States Patent Office 2,822,765
Patented Feb. 11, 1958

2,822,765

BOMBSHELTER

Fred Rudinger, New York, N. Y., assignor to Gibraltar Shelters Inc., New Rochelle, N. Y., a corporation of New York Application February 13, 1956, Serial No. 564,971

1 Claim. (Cl. 109—1)

The present invention relates to a bombshelter, and more particularly to a relatively low-cost bombshelter for individual homes, and which affords some protection against the radioactivity and intense heat attendant the explosion of an atom bomb or a hydrogen bomb.

The development of nuclear weapons has greatly magnified the problem of protecting civilian populations against bombing raids. Due to the force and power of nuclear weapons, there is no known method of saving persons who are directly in the area of the burst of an atom bomb or in the proximate vicinity thereof. The focal center of an atom bomb burst is sometimes referred to as "ground-zero," and no structural materials presently known are available which can withstand such burst at its focal zone. Accordingly, the use of bombshelters against nuclear weapons is primarily intended to protect persons situated some distance from ground-zero, such as three-quarters of a mile or more.

In recent years a variety of proposals have been advanced for bombshelters, but in the main they have not been satisfactory. Thus, bombshelters have been designed out of metal vessels having a single entrance, these metal shelters are intended to be disposed beneath the ground proximate a residence. However, such shelters are not feasible for a variety of reasons. Thus, they are unsightly, causing rises and hills in the ground, and in the event of a sudden air attack, they are relatively inaccessible not being directly connected to the residence. Moreover, the single entrance of such shelters may become clogged by the bomb burst, with the resultant fatal entombment of the occupants within the shelter.

Other bombshelters have been proposed which are at the same level as the basement floor of the residence to which they are appurtenant. These too are not altogether desirable because they require a covering of earth of at least three feet to provide any degree of protection, and thus require the surrounding land of the house to be graded to an unsightly degree in order to insure protection of the occupants within the shelter. Moreover, shelters which are mere extensions of the basement, and which have but a single exit, namely through the basement, are prone to result in entrapment of the occupants of the shelter when the building above the basement collapses. Thus, the collapse of a building adjacent a shelter whose exit lies solely through the building's basement would in all likehood prevent the escape of the occupants of the shelter, not withstanding their survival of the blast which demolished the building.

In addition to the foregoing, a salient consideration which has not been taken advantage of in prior bomb shelter designs are the characteristics of gamma radiation. Gamma radiation constitutes the longest carrying and most penetrating and most deadly radiation released by the explosion of an atom bomb or a hydrogen bomb. Gamma radiation is believed to constitute light waves of very short wavelength and is known to have a far greater carrying power and penetrating effect than alpha particles, beta particles and other radioactive by-products of an atom bomb explosion.

A fundamental characteristic of gamma radiation is that it travels in a straight line from its source.

This invention has as an object the provision of an effective bombshelter, which may be cheaply and easily constructed.

This invention has as a further object the provision of a bombshelter which is appurtenant and readily accessible to a conventional basement-containing family dwelling.

This invention has as a further object the provision of a bombshelter appurtenant to a basement-containing family dwelling, which is unobtrusive and which does not interfere with the enjoyment of such family dwelling.

Other objects will appear hereinafter.

For the purpose of illustrating the invention there is shown in the drawings a form which is presently preferred; it being understood, however, that this invention is not limited to the precise arrangements and instrumentalities shown.

Referring to the drawings wherein like reference characters refer to like parts:

Figure 1:
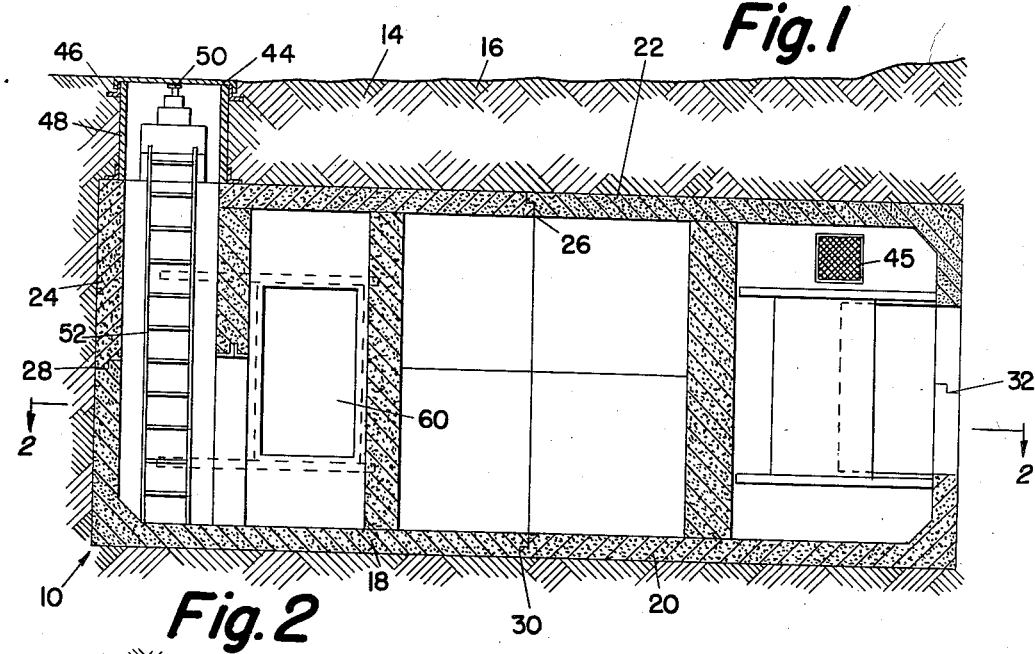
Figure 1 is a vertical sectional view through the bombshelter of the present invention taken on line 1—1 of Figure 2.

Referring to the drawings, the shelter of the present invention is designated 10, and is situated adjacent a basement-containing dwelling, such as a family residence, somewhat below the level of the basement floor 12 (see Figure 3). By being below the level of the basement floor 12, bombshelter 10 may be covered by upwards of three feet of earth 14 without affecting the grade level of the lawn 16 adjacent the residence.

The bombshelter 10 is preferably formed of four precast elements of reinforced concrete designated 18, 20, 22 and 24. As shown particularly in Figures 1 and 2, these precast reinforced concrete elements 18, 20, 22 and 24 do not have flat abutting edges, but instead, the abutting cemented edges are rabbeted as at 26, 28, 30 and 32. This provides maximum strength at the joint, and as will be more fully explained below, provides maximum resistance to the penetration of gamma radiation.

The entrance to bombshelter 10 is from the basement floor 12 over a monolithic flood barrier 34 which provides protection against flooding should a bursting pipe in the basement flood the basement with water. In back of barrier 34 are stairs 36 which descend to bombshelter 10.

Figure 3:
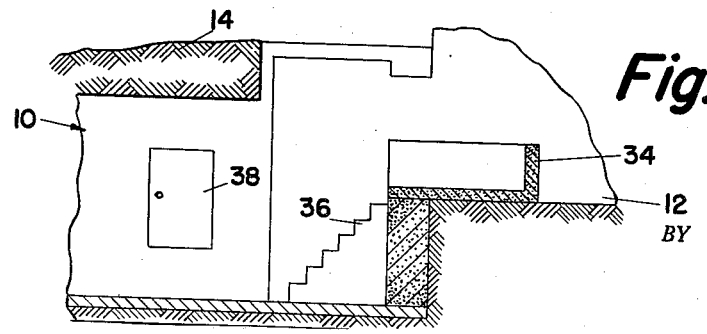
Figure 3 is a fragmentary vertical sectional view of the entrance to the bombshelter from the basement of the appurtenant family dwelling.

Stairs 36, as is evident from an examination of Figure 3, are at right angles to the entrance door 38 of bombshelter 10.

It is also to be noted from Figure 3 that bombshelter 10 is situated well below the level of basement floor 12, yet the bottom of door 38 is relatively close to the level of basement floor 12. Thus, the stairwell for stairs 36 can accommodate an appreciable amount of overflow water, should water in the basement flood over monolithic barrier 34, prior to any degree of contact between such water and door 38.

Figure 2:
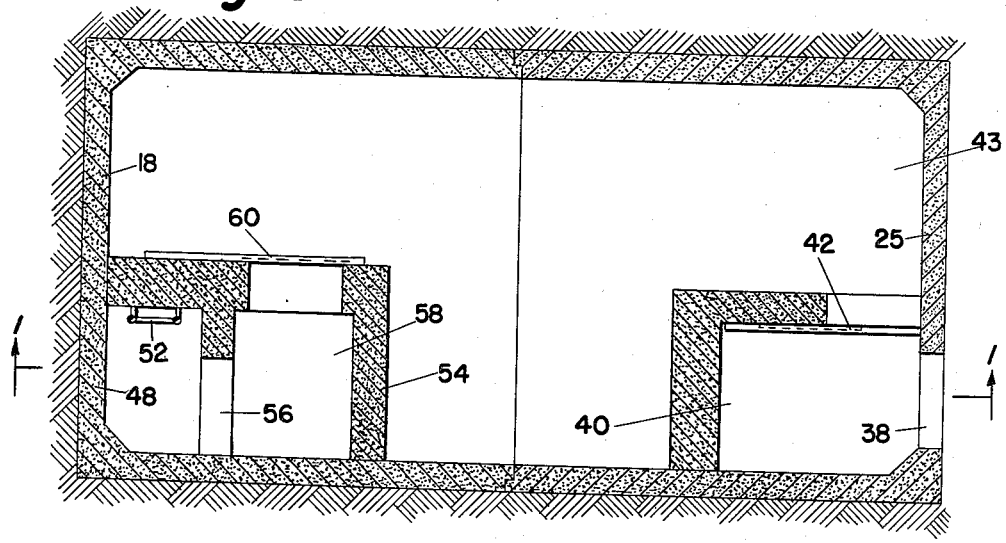
Figure 2 is a horizontal sectional view of the bombshelter of the present invention taken on line 2—2 of Figure 1.

Behind door 38 and within bombshelter 10 is a small partitioned area designated 40 (see Figure 2). Partitioned area 40 is provided with a door 42, at right angles to door 38, for permitting access to the occupancy portion 43 of bombshelter 10. As shown in the drawings, door 42 is preferably a sliding door.

Within partitioned area 40 the bombshelter's generator and air purifier may be situated. The generator may be powered by means of an external tank or cylinder of gasoline or other fuel, and hand-operated emergency means may be provided for operating such generator. The generator may be used to operate lights within bombshelter 10, and to operate the air purifier for the ventilator system therefor.

The ventilator system for the bombshelter 10 preferably comprises an internal air purifier, which removes carbon dioxide from the air. This type of internal air purifier is well known to the art and as it forms no part of the present invention, is not described herein. An internal air purifier is to be preferred over an external ventilator duct, as the use of such a duct not only weakens the bombshelter at the point of its emergence therefrom, but is apt to be readily destroyed by the explosion of the atom bomb. Filter means 45 of conventional design for the ventilator used in bombshelter 10 is shown in Figure 1.

An alternate exit in the event of the collapse of the dwelling adjacent bombshelter 10 is provided at the portion of bombshelter 10 remote from door 38. This exit includes a cover 44 made of a heavy and durable metal, which may be a metal including lead or other metallic element which effectively impedes the penetration of gamma radiation. Cover 44 is provided with a depending annular skirt which tightly fits onto an upper flange 46 of bombshelter escape hatch 48. The upper end of escape hatch 48 is provided with a powerful manually operated mechanical jack 50 which may be used to remove cover 44. A vertical ladder 52 is provided within escape hatch 48 and extends from the floor thereof to a point just below cover 44.

Escape hatch 48 is partitioned off from the remainder of bombshelter 10 by reinforced concrete partitions 54, a passageway 56 being provided from escape hatch 48 to an adjacent partitioned area 58 within bombshelter 10. Access may be had to partitioned area 58 from the occupancy portion 43 of bombshelter 10 by means of sliding door 60 which is positioned at right angles to passage way 56.

In the bomb shelter 10 of the present invention, door 38 is at right angles to doors 42 and 60, as is cover 44, so that gamma radiation moving as it does in a straight line will always have presented to it at least one thickness of reinforced concrete and a door. Thus, if either or both cover 44 and door 38 in bombshelter 10 are inadvertently left open, or smashed by the force of the nuclear explosion, the occupants of bombshelter 10 will still have a concrete wall and a door protecting them from gamma radiation.

The use of prefabricated concrete structural elements with rabbeted joints insures maximum strength. Thus, even at the joint region, such as at joints 26, 28, 30 and 32 there is always presented at least a half thickness of concrete in addition to the mortar to gamma radiation emanating from the nuclear weapon.

The walls of the bombshelter 10 and the doors thereof may be coated with lead coatings or sheets, or lead or other gamma radiation resisting material may be directly incorporated into the building components of bombshelter 10.

The present invention may be embodied in other specific forms without departing from the spirit or essential attributes thereof and, accordingly, reference should be made to the appended claim, rather than to the foregoing specification as indicating the scope of the invention.

I claim:

A residence dwelling comprising a basement, a passageway in the wall of said basement, said passageway descending appreciably below the level of the floor of the basement, an upright barrier on the floor of the basement barring the entrance to the passageway, the space intermediate the top of said barrier and the ceiling of the passageway being sufficient to permit a person to obtain access to the passageway, a generally imperforate shell formed from a plurality of precast concrete shell members in communication with said passageway, said shell having a rectangular cross-section, said precast concrete shell members being joined together along rabbeted joint lines, an entrance into said shell formed in one vertical wall of said shell, said entrance including a door spaced somewhat above the floor of the shell and passageway, a surrounding concrete partition within said shell proximate to and spaced from said door, an interior door in said partition positioned in a plane generally normal to the plane of said door, an escape hatchway extending through the uppermost precast concrete shell member at a point opposite from said entrance, a fitted cover for said hatchway, means disposed in the upper portion of said hatchway for raising said cover, a surrounding concrete partition within said shell proximate the escape hatchway, an interior door in said partition positioned in a plane generally normal to the plane of the entrance door, with said entire shell being disposed beneath the surface of the ground except for said fitted cover, said fitted cover being substantially flush with the ground surface.

References Cited in the file of this patent

UNITED STATES PATENTS

| | | |
|---|---|---|
| 534,232 | Spencer | Feb. 12, 1895 |
| 2,704,983 | Van Dronkelaar | Mar. 29, 1955 |

FOREIGN PATENTS

| | | |
|---|---|---|
| 7,487 | Great Britain | June 8, 1911 |
| 64,951 | Norway | June 22, 1940 |
| 513,468 | Great Britain | Oct. 13, 1939 |